(12) United States Patent
Zhang et al.

(10) Patent No.: US 8,908,544 B1
(45) Date of Patent: Dec. 9, 2014

(54) MULTIPLE POWER MODES FOR 802.11N RADIO

(75) Inventors: Hongyuan Zhang, Fremont, CA (US); Rohit U. Nabar, Sunnyvale, CA (US); Srinivasa H. Garlapati, San Ramon, CA (US)

(73) Assignee: Marvell International Ltd (BM)

( * ) Notice: Subject to any disclaimer, the term of this patent is extended or adjusted under 35 U.S.C. 154(b) by 922 days.

(21) Appl. No.: 12/707,923

(22) Filed: Feb. 18, 2010

Related U.S. Application Data

(60) Provisional application No. 61/160,407, filed on Mar. 16, 2009.

(51) Int. Cl.
*G01R 31/08* (2006.01)

(52) U.S. Cl.
USPC .......................................... 370/252; 370/328

(58) Field of Classification Search
USPC ......................................... 370/252, 328, 338
See application file for complete search history.

(56) References Cited

U.S. PATENT DOCUMENTS

| | | | | |
|---|---|---|---|---|
| 5,528,623 | A * | 6/1996 | Foster, Jr. ....................... | 375/133 |
| 5,969,675 | A * | 10/1999 | Erlick ............................ | 342/373 |
| 6,208,279 | B1 * | 3/2001 | Oprescu ........................ | 341/143 |
| 7,321,755 | B2 * | 1/2008 | Hulvey ....................... | 455/343.1 |
| 7,460,890 | B2 * | 12/2008 | Liang et al. ................. | 455/343.1 |
| 7,525,215 | B2 * | 4/2009 | Keenly et al. ..................... | 307/6 |
| 7,826,473 | B2 * | 11/2010 | Kwon et al. .................... | 370/445 |
| 7,869,408 | B2 * | 1/2011 | Seals et al. ..................... | 370/333 |
| 7,978,088 | B2 * | 7/2011 | Black et al. ................. | 340/636.2 |
| 8,064,411 | B2 * | 11/2011 | Ecclesine ...................... | 370/337 |
| 8,072,913 | B2 * | 12/2011 | Desai ............................ | 370/311 |
| 8,081,714 | B2 * | 12/2011 | Ibrahim et al. ................ | 375/324 |
| 2007/0010237 | A1 * | 1/2007 | Jones et al. .................. | 455/422.1 |
| 2007/0091859 | A1 * | 4/2007 | Sethi et al. .................... | 370/338 |

OTHER PUBLICATIONS

IEEE P802.11 Wireless LANs, doc.: IEEE 802.11-04/0889r6, May 2005.

* cited by examiner

*Primary Examiner* — Ricky Ngo
*Assistant Examiner* — Christine Ng

(57) ABSTRACT

Example apparatus and methods provide multiple power modes for an 802.11N radio. In one embodiment, an apparatus includes a radio frequency (RF) unit including a transmit circuit configured to transmit RF signals to an antenna, and a receive circuit configured to receive RF signals from the antenna. The apparatus may also include a baseband unit configured to analyze RF signals received by the RF unit. The baseband unit may also be configured to provide signal strength information concerning the RF signals received by the RF unit and/or channel quality information concerning a channel associated with the RF signals received by the RF unit. The apparatus may also include a MAC logic configured to control the RF unit to operate in either a power save mode or in a high power mode based on the signal strength information or the channel quality information provided by the baseband unit.

15 Claims, 3 Drawing Sheets

MULTIPLE POWER MODES FOR 802.11N RADIO

CROSS REFERENCE TO RELATED APPLICATIONS

This application claims the benefit of U.S. provisional application Ser. No. 61/160,407, filed on Mar. 16, 2009, which is hereby incorporated by reference.

BACKGROUND

An 802.11n radio includes a transceiver. Radio Frequency (RF) circuitry in the transceiver is configured to suppress phase noise produced by analog circuitry in the radio. Phase noise is suppressed to reduce RF impairments experienced at baseband. However, suppressing the phase noise may consume an unacceptable amount of power in the radio. The unacceptable power consumption may have undesired consequences with respect to battery power consumption in mobile devices.

An 802.11n radio can transmit and receive data at different data rates and using different encoding schemes. Different data rates and different encoding schemes have different RF impairment requirements. For example, lower data rates can withstand higher amounts of RF impairment and still produce useable data while higher data rates can only withstand lower amounts of RF impairment and still produce useable data. By way of illustration, an 802.11n radio operating at a lower data rate can tolerate more phase noise at baseband than an 802.11n radio operating at a higher data rate. However, conventional 802.11n radios typically operate at one power mode that constantly seeks to reduce phase noise to the lowest possible level.

SUMMARY

In one embodiment, an apparatus comprises a radio frequency unit including a transmit circuit configured to transmit radio frequency signals to an antenna, and a receive circuit configured to receive radio frequency signals from the antenna. The apparatus may also include a baseband unit configured to analyze radio frequency signals received by the radio frequency unit, and to provide one or more of (i) a signal strength information concerning the radio frequency signals received by the radio frequency unit or (ii) a channel quality information concerning a channel associated with the radio frequency RF signals received by the radio frequency unit. The apparatus may also include a MAC logic configured to control the radio frequency unit to operate in either a power save mode or in a high power mode based, at least in part, on the signal strength information or the channel quality information provided by the baseband unit.

In another embodiment, a method comprises controlling a circuit on an 802.11n radio to determine a power level at which a receive circuit and a transmit circuit in the 802.11n radio are to operate to achieve a pre-determined phase noise suppression level associated with a pre-determined data communication state at which the 802.11n radio is to communicate with an access point. The method also includes providing an electrical signal on the 802.11n radio to control the 802.11n radio to operate at the power level.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatuses and methods selectively control an 802.11n radio to operate in different power states based on observed conditions. In one example, an apparatus toggles an 802.11n radio between a high power phase noise reduction state (high power mode) and a power save phase noise reduction state (power save mode). When the radio is operating at a lower data rate, example apparatuses and methods selectively dynamically control the RF circuitry in the radio to enter the power save mode. A decision to enter the power save mode can be made based on a property associated with an access point (AP) with which the radio is communicating. A decision to enter the power save mode can also be made based on signal strength detected between communicating devices. The signal strength can be a function of the distance between the communicating devices. The signal strength may be reported using, for example, a received signal strength indicator (RSSI).

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic, and so on. The physical manipulations transform electronic components and/or data from one state to another.

Figure 1:
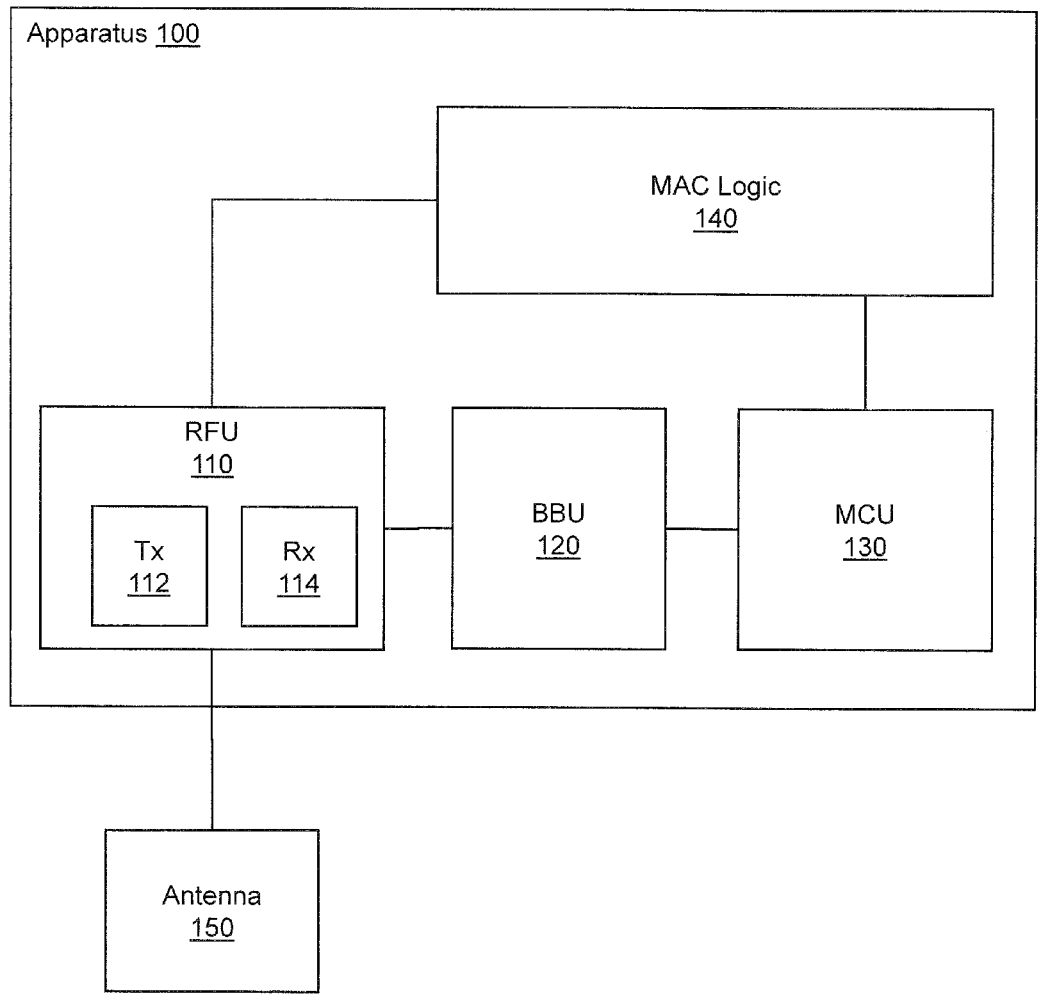
FIG. 1 illustrates an embodiment of an apparatus configured to control power modes for an 802.11n radio.

FIG. 1 illustrates an example apparatus 100. Example apparatus 100 includes a radio frequency unit (RFU) 110, a baseband unit (BBU) 120 and a media access control (MAC) hardware unit (MCU) 130. The radio frequency unit 110 is connected to an antenna(s) 150. The radio frequency unit 110 includes both a receive (Rx) circuit 114 and a transmit (Tx) circuit 112. The MAC hardware unit 130 and the radio frequency unit 110 communicate with a MAC logic 140. The MAC logic 140 receives information from the MAC hardware unit 130 and provides a control signal to the radio frequency unit 110. The control signal toggles the radio frequency unit 110 between a power save mode and a high power mode. The control signal can control the Rx block 114 and the Tx block 112 collectively and/or individually. While a single power save mode and a high power mode are described, MAC logic 140 can control the radio frequency unit 110 to operate in different (e.g., multiple) power modes.

In different embodiments, MAC logic 140 can be, but is not limited to, hardware, firmware, instructions in execution on a machine, and/or combinations thereof to perform a function (s) or an action(s), and/or to cause a function or action from another logic, method, apparatus, and/or system. MAC logic 140 may include a software controlled microprocessor, a discrete logic (e.g., ASIC), an analog circuit, a digital circuit, a programmed logic device, a memory device containing instructions, and so on. MAC logic 140 may include one or more gates, combinations of gates, or other circuit components. Other "logics" described herein may take forms similar to those described in connection with MAC logic 140.

When the example apparatus 100 communicates using a certain modulation and coding scheme (MCS), the apparatus 100 may require lower RF impairment from phase noise. Similarly, when the example apparatus 100 communicates at a certain data rate, the apparatus 100 may require lower RF impairment from phase noise. In these two states (e.g., high MCS, high data rate), the MAC logic 140 provides a control signal that causes the radio frequency unit 110 to operate at the high power state. In one example, the decision to enter the high power state may only be made when the example apparatus 100 is within a pre-defined distance of an access point (or other type of wireless device—e.g., as in peer-to-peer communications). While a pre-defined distance is described, the decision to enter the high power state may be based on signal strength. There is typically an inverse quadratic relationship between distance and signal strength.

The example apparatus 100 can measure signal strength and determine that an access point is too far away for the radio frequency unit 110 to operate in high power mode. In this case, the MAC logic 140 controls the radio frequency unit 110 to operate in the power save mode. In one embodiment, the power save mode can affect the power in both the Tx circuit 112 and the Rx circuit 114 of the radio frequency unit 110. In another embodiment, the power save mode can affect the power in either the Rx circuit 114 in the radio frequency unit 110 or the Tx circuit 112 in the radio frequency unit 110.

The example apparatus 100 can determine that the access point and the radio frequency unit 110 are communicating at a data rate below that requiring high power mode. The MAC logic 140 may determine that an access point is a legacy (e.g., 802.11g/a, 802.11b) device and thus the data rate will be below a high power threshold. In this case, the MAC logic 140 may also control the radio frequency unit 110 to operate in the power save mode. In one embodiment, the MAC logic 140 is implemented in software, in another embodiment, MAC logic 140 is implemented in hardware, and in yet another embodiment, MAC logic 140 is implemented in a combination of hardware and software.

In the following example, apparatus 100 determines whether to operate in power save mode or high power mode based on whether an access point that the apparatus 100 is communicating with is a legacy device. The MAC logic 140 can determine that the example apparatus 100 is communicating with a legacy access point device, for example, by decoding a beacon packet transmitted from the access point. The MAC logic 140 can also determine that the apparatus 100 is communicating with an 802.11n access point, for example, by examining a packet received by the baseband unit 120. The packet received by the baseband unit 120 can be either a beacon packet or a normal packet. After receiving the packet, the baseband unit 120 can provide information concerning the signal strength (e.g., RSSI) and/or channel quality (CQ) to the MAC logic 140. The channel quality information may identify a sub-stream signal to noise ratio (SNR) at baseband after channel equalization and before decoding. The signal strength information and/or the channel quality information can be provided to the MAC logic 140 through the MAC hardware unit 130. The MAC logic 140 can then decide to control the radio frequency unit 110 to operate at the power save mode or the high power mode based on the signal strength information and/or the channel quality information.

In one example, if the RSSI of a packet received at the baseboard unit 120 from the access point is lower than a threshold, then the MAC logic 140 will control the radio frequency unit 110 to operate in power save mode. The threshold can be computed as a function of a sustainable signal strength for a high data rate.

In another example, if the channel quality of a packet received at the baseboard unit 120 from the access point is lower than a threshold, then the MAC logic 140 will control the radio frequency unit 110 to operate in power save mode. The threshold can be computed as a function of a sustainable post-equalizer signal strength associated with maintaining a high data rate.

In another example, the decision to control the radio frequency unit 110 to operate in power save mode can be based on a combination of RSSI and channel quality information. For example, if one or both of the RSSI and channel quality information fall below a threshold for N packets during a time period T, then the MAC logic 140 will control the radio frequency unit 110 to operate in power save mode.

In another example, the decision to control the radio frequency unit 110 to operate in power save mode can be based solely on RSSI and/or channel quality information acquired from beacon frames.

In another example, the MAC logic 140 will, by default, control the radio frequency unit 110 to operate in power save mode. In this example, the MAC logic 140 will only control the radio frequency unit 110 to operate in high power mode upon determining that one of two conditions exists at apparatus 100. The first condition concerns determining that a packet has been received with an MCS larger than the rate beyond which low level RF impairment is required. After receiving the MCS7 packet, the MAC logic 140 will control the radio frequency unit 110 to operate in high power mode. The second condition concerns determining that a packet with an MCS larger than the rate beyond which low level RF impairment is required is about to be transmitted by the apparatus 100. The first condition would be met when an MCS7 packet is received. The second condition would be met when an MCS7 packet is about to be transmitted. Before transmitting the MCS7 packet, the MAC logic 140 will control the radio frequency unit 110 to operate in high power mode.

The first condition appears to present a dilemma concerning how the apparatus 100 can receive an MCS7 packet while in power save mode when MCS7 requires high power mode. The dilemma is resolved by understanding that the HT_Signal field of the 802.11n packet, which signals the MCS index, is modulated at a lower rate that can be decoded even when the apparatus 100 is operating in power save mode. Therefore, the apparatus 100 can receive and decode the HT_Signal field while in power save mode, understand that high power mode is required, and enter high power mode. In this example, the data portion of the first MCS7 packet may be lost because it was coded at the access point at a higher data rate than can be successfully decoded by apparatus 100 while in power save mode. However, subsequent packets will not be lost because the first "sacrificial" packet has informed apparatus 100 to turn off power save mode and to turn on high power mode.

Channel conditions may change over time. For example, a person using a mobile device is likely to move around, thereby changing the distance between the mobile device and an access point, or changing which obstructions intervene between the access point and the mobile device. Also, different access points may operate at different data rates, with different modulation and coding schemes, with different power levels, and with other different operating parameters. Therefore, a decision concerning controlling the radio frequency unit 110 to operate in power save mode can be made at one point in time and then made again at another point in time. This way, example apparatuses and methods can dynamically control the mobile device to operate in an appropriate mode, (e.g., power save, high power) based on the current conditions experienced by the mobile device.

In the following example, a system is configured with a single antenna connected to a radio frequency unit. Assume that the example system is configured to support communications using MCS0 through MCS7. MCS7 involves transmitting at a higher data rate than MCS0-6 and MCS0 involves transmitting at a lower data rate than MCS1-7. While MCS7 may require stringent phase noise control (e.g., <0.8 rms degree), MCS0-6 may be able to operate with relaxed phase noise control (e.g., up to 1.2 rms degree). When a MAC logic in the example system determines that the example system is communicating using one of MCS0 through MCS6, the MAC logic will control the radio frequency unit to operate in power save mode. When the MAC logic determines that the example system is communicating using MCS7, the MAC logic may then make additional decisions before determining to control the radio frequency unit to operate in high-power mode. For example, the MAC logic may determine whether the access point is too far away to realistically support MCS7 for a relevant time period. If the access point is too far away to realistically support MCS7 for a relevant period of time, then the MAC logic can control the radio frequency unit to operate in power save mode. If MCS7 is sustainable for a relevant time period, then the MAC logic can control the radio frequency unit to operate in high-power mode.

Figure 2:
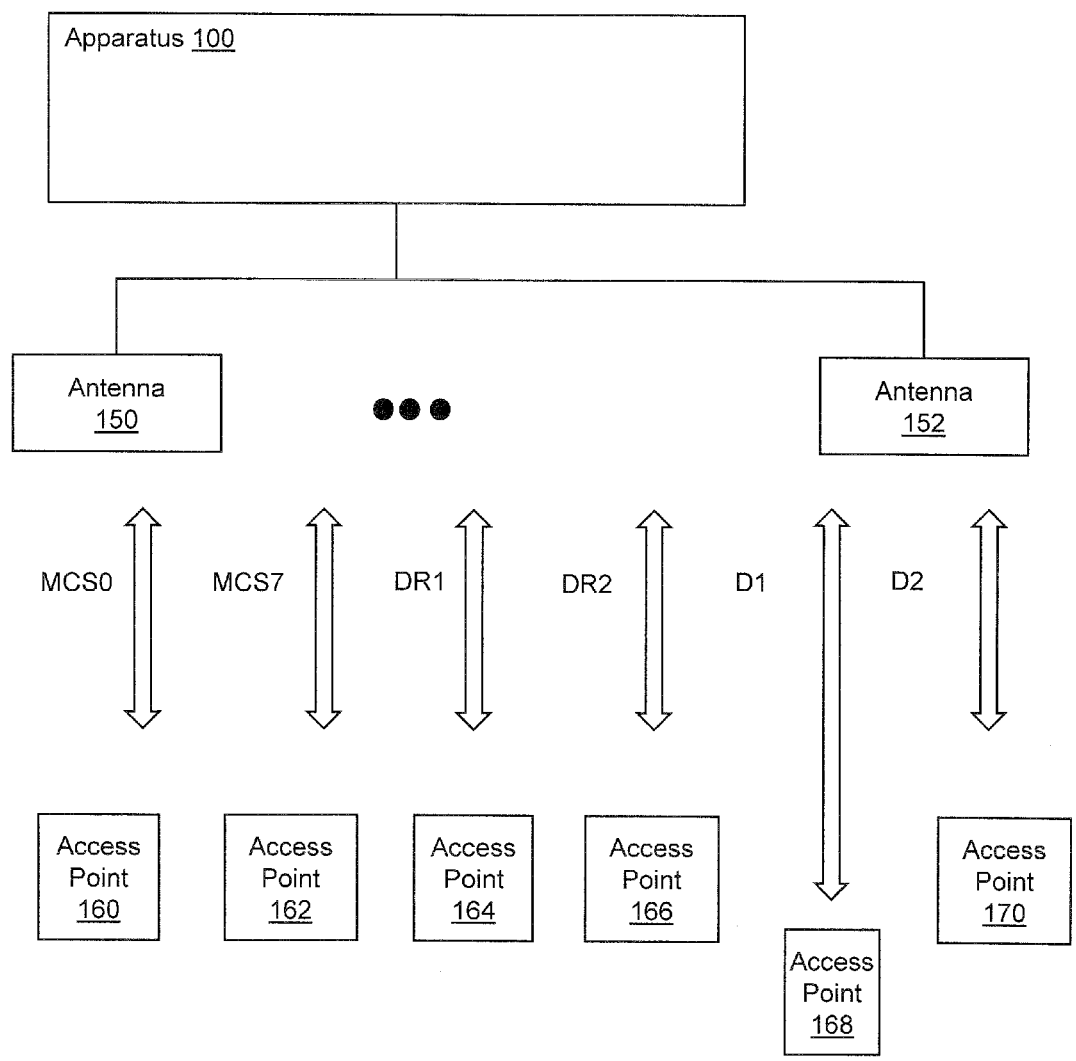
FIG. 2 illustrates an environment in which an apparatus configured to control power modes for an 802.11n radio operates.

FIG. 2 illustrates an environment in which example apparatuses and methods described herein can operate. An apparatus 100 is illustrated being connected to a set of antennas 150 through 152. Apparatus 100 can interact with different access points at different times. Therefore apparatus 100 is illustrated communicating with access points 160, 162, 164, 166, 168, and 170. One skilled in the art will appreciate that apparatus 100 is likely to communicate with one access point at a time, but that apparatus 100 could communicate with more than one access point.

Apparatus 100 may communicate with access point 160 using a first modulation and coding scheme (e.g., MCS0) and therefore, when communicating with access point 160, may operate in power save mode. Apparatus 100 may communicate with access point 162 using a second modulation and coding scheme (e.g., MCS7) and therefore, when communicating with access point 162, may operate in high power mode. Apparatus 100 may communicate with access point 164 using a first data rate (e.g., DR1) that can tolerate higher phase noise and therefore, when communicating with access point 160, may operate in power save mode. Apparatus 100 may communicate with access point 166 using a second data rate (e.g., DR2) that has stringent phase noise requirements and therefore, when communicating with access point 166, may operate in high power mode. Apparatus 100 may also communicate with access points that are located different distances from apparatus 100. Even if the two access points are otherwise identical, apparatus 100 may still operate in different modes based on a signal strength that is a function of a distance to the access points. For example, except for distance from apparatus 100, access point 168 and access point 170 may be identical. But apparatus 100 may operate in power save mode when interacting with access point 168 while operating in high power mode when interacting with access point 170 due to the likelihood of being able to maintain a data rate above a threshold level requiring high power mode.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
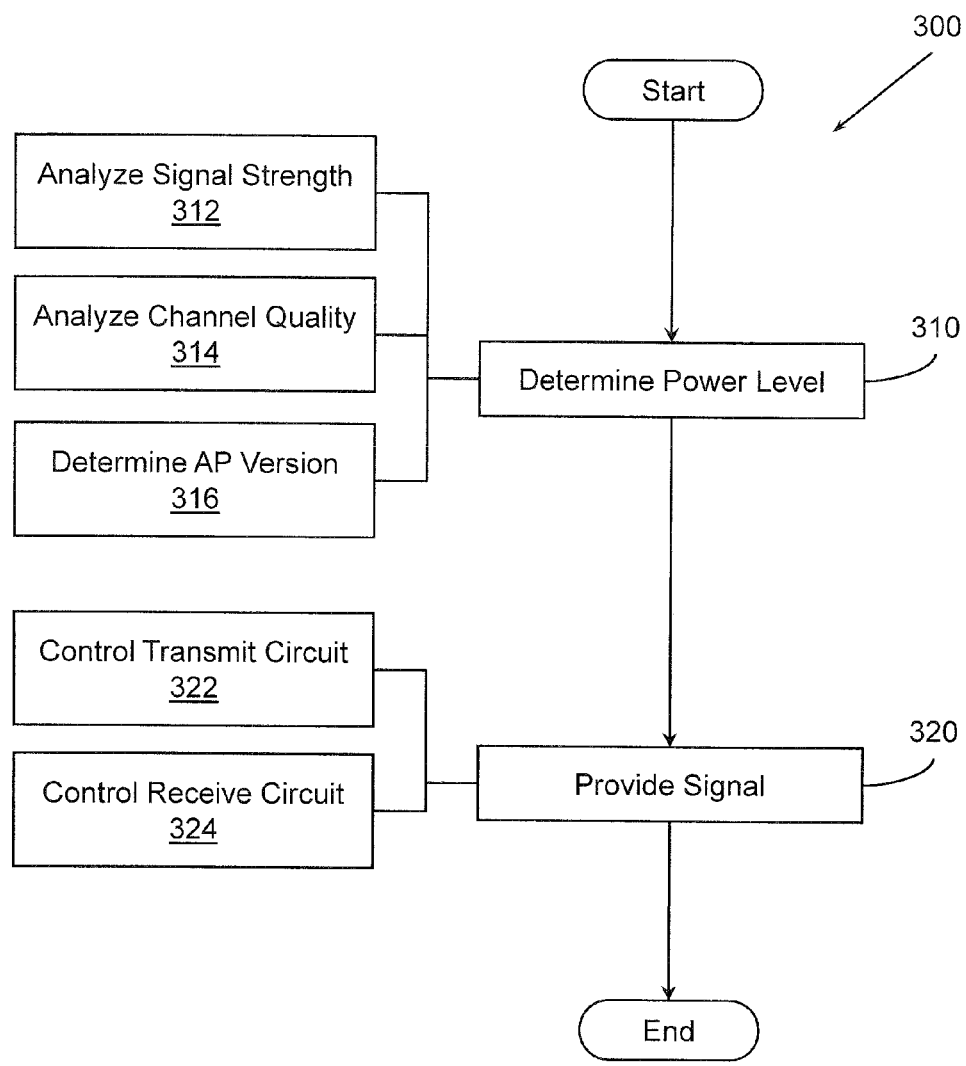
FIG. 3 illustrates a method for controlling power modes in an 802.11n radio.

FIG. 3 illustrates a method 300. At 310, method 300 includes controlling a circuit on an 802.11n radio to determine a power level at which a receive circuit and a transmit circuit in the 802.11n radio are to operate. The power level is determined so that the 802.11n radio can achieve a desired phase noise suppression level associated with a desired data communication state at which the 802.11n radio is to communicate with an access point.

At 320, method 300 includes providing an electrical signal on the 802.11n radio to control the 802.11n radio to operate at the power level. For example, the electrical signal can control transmit and/or receive circuits to operate at the power level.

In different embodiments, controlling the circuit at 310 to determine the power level can involve analyzing different information. At 312, method 300 includes analyzing a signal strength for a signal received by the 802.11n radio from the access point. At 314, method 300 includes analyzing a channel quality for a channel on which the 802.11n radio communicates with the access point. At 316, method 300 includes analyzing a version of the access point, where the version is identified from a beacon packet provided by the access point. The power level can be determined as a function of the observed conditions (e.g., signal strength, channel quality, access point version) and as a function of the desired phase noise suppression. In one example, the desired phase noise suppression level is at least 0.8 rms degree for MCS7 and at least 1.2 rms degree for MCS0 through MCS6.

Controlling the 802.11n radio to operate at the power level can involve controlling different circuits in the radio. For example, controlling the radio at 320 can include providing a control signal to one or more of a receive circuit and transmit circuit. At 322, method 300 controls a transmit circuit. At 324, method 300 controls a receive circuit.

While example systems, methods, and so on have been illustrated by describing examples, and while the examples have been described in considerable detail, the examples are not intended to restrict or in any way limit the scope of the appended claims to such detail. For example, while the examples above are described in connection with communication between a wireless device and an access point, the techniques are also applicable generally to other forms of wireless communication—e.g., wireless communication in peer-to-peer networks, and so on. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
   a radio frequency unit including
      a transmit circuit configured to transmit radio frequency signals to a remote device using an antenna, and
      a receive circuit configured to receive radio frequency signals from the remote device using the antenna;
   a baseband unit configured to
      analyze radio frequency signals received by the radio frequency unit, and
      provide channel quality information concerning a channel associated with the radio frequency signals; and
   a MAC logic configured to control the radio frequency unit to operate in either a power save mode or in a high power mode based, at least in part, on the channel quality information, wherein during the power save mode the radio frequency unit uses a reduced power to actively communicate with the remote device, wherein the channel quality information includes signal strength information that indicates a strength of the radio frequency signals, and wherein the MAC logic is configured to control the radio frequency unit to operate in the power save mode upon determining that the signal strength information indicates that a signal strength of the radio frequency signals is below a pre-determined signal strength threshold, and wherein the predetermined signal strength threshold is based, at least in part, on a sustainable post-equalizer signal strength for a pre-determined data rate.

2. The apparatus of claim 1, wherein the MAC logic is configured to individually control the transmit circuit and the receive circuit to operate in either the power save mode or the high power mode, and wherein actively communicating includes at least transmitting data to the remote device.

3. The apparatus of claim 1, wherein the MAC logic is configured to control the radio frequency unit to operate in the power save mode upon determining a protocol that the remote device is using.

4. The apparatus of claim 3, wherein the apparatus is configured to determine that an access point is an 802.11g/a device or an 802.11b device in response to the baseband unit decoding a beacon packet transmitted from the access point.

5. An apparatus, comprising:
   a radio frequency unit including
      a transmit circuit configured to transmit radio frequency signals to a remote device using an antenna, and
      a receive circuit configured to receive radio frequency signals from the remote device using the antenna;
   a baseband unit configured to
      analyze radio frequency signals received by the radio frequency unit, and
      provide channel quality information concerning a channel associated with the radio frequency signals; and
   a MAC logic configured to control the radio frequency unit to operate in either a power save mode or in a high power mode based, at least in part, on the channel quality information, wherein during the power save mode the radio frequency unit uses a reduced power to actively communicate with the remote device, wherein the MAC logic is configured to control the radio frequency unit to operate in the power save mode upon determining that the channel quality information indicates that the channel quality is below a pre-determined channel quality threshold, and wherein the pre-determined channel quality threshold is based, at least in part, on a substream signal to noise ratio at baseband subsequent to channel equalization and prior to decoding.

6. The apparatus of claim 5, wherein the radio frequency unit is configured to operate in a default power save mode, and wherein the MAC logic is configured to control the radio frequency unit to operate in high power mode upon determining that the radio frequency unit is preparing to transmit an modulation code scheme 7 (MCS7) frame.

7. The apparatus of claim 5, wherein the radio frequency unit is configured to operate in a default power save mode, and wherein the MAC logic is configured to control the radio frequency unit to operate in the high power mode upon determining that the radio frequency unit received a frame that uses a modulation scheme that uses the high power mode.

8. The apparatus of claim 7, wherein the frame is encoded using a modulation code scheme 7 (MSC7), and wherein the MAC logic is configured to determine the frame uses MSC7 based on an HT_Signal field in an 802.11n packet.

9. The apparatus of claim 5, wherein the radio frequency unit is configured to reduce phase noise in the radio frequency signals to less than a threshold amount when operating in the high power mode.

10. The apparatus of claim 5, wherein the radio frequency unit is configured to allow phase noise up to a threshold amount when operating in the power save mode.

11. The apparatus of claim 5, wherein the MAC logic is configured to control the radio frequency unit to operate in either the power save mode or in the high power mode based, at least in part, on channel quality information from only beacon packets only.

12. The apparatus of claim 5, wherein the MAC logic is configured to control the radio frequency unit to operate in the power save mode upon determining that the channel quality information indicates that the channel quality satisfies a predetermined channel quality threshold for a pre-determined number of packets received over a pre-determined period of time.

13. A method, comprising:
controlling a circuit on a radio to
(i) determine a quality of a wireless communication channel between the radio and a remote device, and
(ii) determine a version of a protocol in use by the remote device;
controlling the radio to communicate wirelessly with the remote device using a high power mode based on (i) whether the quality of the communication channel satisfies a predetermined threshold and (ii) whether the version of the protocol is compatible with the high power mode; and
providing an electrical signal to control the radio to communicate with the remote device using a power save mode when the radio does not communicate with the remote device using the high power mode, wherein during the power save mode the radio uses a reduced power to actively communicate with the remote device.

14. The method of claim 13, wherein determining the quality of the wireless communication channel between the radio and the remote device includes determining one or more of:
a signal strength for a signal received by the radio from the remote device, and
a channel quality for a channel on which the radio communicates with the remote device,
wherein the radio identifies the version from a beacon packet received from the remote device.

15. The method of claim 13, wherein actively communicating with the remote device includes using the radio to at least transmit data to the remote device.

* * * * *